(12) United States Patent
Drnevich et al.

(10) Patent No.: US 8,409,307 B2
(45) Date of Patent: Apr. 2, 2013

(54) GASIFICATION AND STEAM METHANE REFORMING INTEGRATED POLYGENERATION METHOD AND SYSTEM

(75) Inventors: Raymond Francis Drnevich, Clarence, NY (US); Aqil Jamal, Richmond, TX (US)

(73) Assignee: Praxair Technology, Inc., Danbury, CT (US)

( * ) Notice: Subject to any disclaimer, the term of this patent is extended or adjusted under 35 U.S.C. 154(b) by 674 days.

(21) Appl. No.: 12/377,111

(22) PCT Filed: Aug. 22, 2007

(86) PCT No.: PCT/US2007/018672
§ 371 (c)(1),
(2), (4) Date: Sep. 15, 2009

(87) PCT Pub. No.: WO2008/024449
PCT Pub. Date: Feb. 28, 2008

(65) Prior Publication Data
US 2010/0158792 A1   Jun. 24, 2010

Related U.S. Application Data

(60) Provisional application No. 60/839,562, filed on Aug. 23, 2006.

(51) Int. Cl.
*B01J 7/00* (2006.01)
*C10J 3/00* (2006.01)
*C01B 3/36* (2006.01)
*C01B 6/24* (2006.01)
*C01B 3/24* (2006.01)

(52) U.S. Cl. .............. 48/197 R; 48/61; 48/202; 48/210; 423/644; 423/650

(58) Field of Classification Search .................. 48/197 R
See application file for complete search history.

(56) References Cited

U.S. PATENT DOCUMENTS

| | | | |
|---|---|---|---|
| 3,854,895 A | 12/1974 | Muller | |
| 3,988,334 A * | 10/1976 | Finch et al. .................. | 518/714 |
| 4,199,327 A | 4/1980 | Hempill et al. | |
| 4,367,077 A * | 1/1983 | Tao .................................. | 48/213 |
| 4,483,691 A * | 11/1984 | McShea et al. ................. | 48/202 |
| 4,833,171 A | 5/1989 | Sweeney | |
| 4,936,869 A | 6/1990 | Minderman et al. | |
| 6,676,716 B2 | 1/2004 | Fujimura et al. | |
| 2002/0103407 A1 | 8/2002 | Hatanaka | |
| 2007/0256360 A1 * | 11/2007 | Kindig et al. ............... | 48/197 A |
| 2008/0016769 A1 * | 1/2008 | Pearson ..................... | 48/197 R |

OTHER PUBLICATIONS

Gray, David et al., "Polygeneration of SNG, Hydrogen, Power, and Carbon Dioxide from Texas Lignite", Mitretek Technical Report, U.S. DOE, Dec. 2004.
Miller, C.L. et al., "Hydrogen from Coal Program—Research, Development and Demonstration Plan for the Period 2004 through 2015", Draft Report prepared by NETL, U.S. DOE, Sep. 26, 2005.
Perry, Myria, et al., "CO2 Recovery and Sequestration at Dakota Gasification Company", paper presented at Gasification Technologies Conference, San Francisco, CA, Oct. 2004.

* cited by examiner

*Primary Examiner* — Matthew Merkling
(74) *Attorney, Agent, or Firm* — Iurie A. Schwartz

(57) ABSTRACT

This invention is a process and system for providing hydrogen at a high level of reliability from a gasification system by integrating it with SMR. Carbonaceous feedstock such as petroleum coke or coal or biomass is gasified to co-produce SNG, fuel gas, hydrogen, power and steam in conjunction with hydrogen production through steam methane reforming. Carbon dioxide may also be recovered in this process. The integrated schemes are designed in a way that maximizes the reliability of production of high value products such as hydrogen through gasification and minimizes the impact of high natural gas prices on hydrogen production by SMR.

10 Claims, 11 Drawing Sheets

GASIFICATION AND STEAM METHANE REFORMING INTEGRATED POLYGENERATION METHOD AND SYSTEM

CROSS-REFERENCE TO RELATED APPLICATION

The present invention claims priority to U.S. provisional patent application Ser. No. 60/839,562 filed Aug. 23, 2006, and International Patent Application No. PCT/US2007/018672, filed on Aug. 22, 2007, the contents of which are incorporated herein by reference in its entirety.

FIELD OF THE INVENTION

The present invention is related to the integration of gasification and power generation systems with synthetic or substitute natural gas (SNG) conversion and steam methane reforming (SMR) units for hydrogen production with a high level of reliability and minimum impact on energy efficiency and cost.

BACKGROUND OF THE INVENTION

In petroleum refineries, hydrogen is used for hydrotreating and hydrocracking operations for the production of low sulfur transportation fuels. Recent regulatory push toward low-sulfur gasoline and ultra-low sulfur diesel products has necessitated refineries to upgrade and expand desulfurization capacity. Desulfurization is primarily accomplished by hydrotreating high-sulfur refinery streams. Severe hydrotreating, requiring significant consumption of hydrogen, is necessary to reach the very low levels of sulfur being required, 30 ppm for gasoline and 15 ppm for diesel fuel. This drive toward cleaner fuels is anticipated to continue into the next decade, resulting in further increases in demand for hydrogen.

Currently, US hydrogen production is about 9 million tons per year of which 85% is used at the site of generation. About 95% of this hydrogen is made by steam reforming of natural gas. As a result, the cost of hydrogen is highly sensitive to natural gas prices. Recent spot prices for natural gas have been volatile, ranging between $6 and $14 per million Btu and have averaged around $10 per million Btu during 2005. Thus the need for alternate options that minimize exposure of hydrogen prices to volatile natural gas market continues to exist.

Hydrogen from gasification of carbonaceous materials such as coal and petroleum coke is one of the technically attractive options. Coking capacity in the U.S. has risen by about 60% in the past decade. Traditionally, U.S. Gulf Coast refineries producing high-sulfur coke have sold their petroleum coke into overseas markets at roughly breakeven values of less than $5 per ton. If natural gas prices continue to remain high in the future, there will be opportunities to use low-cost petroleum coke and/or coal in place of natural gas to produce hydrogen through gasification. The petroleum coke could also be used to produce SNG as a natural gas supplement. Since SNG uses the same infrastructure as natural gas, SNG could be easily sold through the existing pipeline system.

The main barrier to making hydrogen from coal and/or petroleum coke gasification is the high capital investment. Another drawback of producing hydrogen by gasification is that petroleum refineries require hydrogen to be available 98+% of the time. This level of reliability of supply is generally not possible with current gasification technology because gasification systems with a single gasifier have been shown to have only 80-85% availability particularly in the first few years of operation. Adding a spare gasifier helps, but it increases the capital cost appreciably and the availability is still not as high as that achieved from conventional SMR where the availability is more than 98%.

Thus it is desirable to develop processes that maximize the reliability of hydrogen production through the gasification of cheaper carbonaceous fuels while minimizing the impact on energy efficiency and cost of production. The carbonaceous fuel is any solid or liquid or gaseous combustible organic material that can be used as a feedstock to a gasification process to produce syngas. This invention reveals novel concepts and methods for providing hydrogen at a high level of reliability from a gasification system by integrating it with SMR.

A. Gasification, Gas Cleanup and Acid Gas Removal

The process of gasifying carbonaceous material into syngas is generally known in the industry. In gasification process syngas is commonly produced from gaseous combustible fuels such as natural gas or associated gas, and liquid and solid combustible organic fuels, such as, coal, petroleum coke, wood, tar sand, shale oil, and municipal, agricultural or industrial waste. The gaseous or liquid or solid combustible organic fuels are reacted at high temperature in a refractory-lined vessel with air, enriched air or high purity oxygen in an oxygen deficient environment in the presence of steam which acts as temperature moderator. When syngas from the gasifier is used to produce hydrogen and SNG, use of high-purity oxygen (95+ mol %) is the preferred mode of operation.

Any of the numerous commercially available gasification technologies can be utilized, for example, fixed (or moving) bed, fluid bed or entrained flow. The fixed bed technology has been used commercially since at least the 1940's and the leading technology is the Lurgi technology most notably employed by Sasol in South Africa and Great Plains Synfuels plant in North Dakota, USA. These gasifiers have proven track record of reliable operation with low rank coals. The alternative fixed bed technology that has also been tested on petroleum coke and municipal and industrial waste is the British Gas/Lurgi (BGL) technology. Although this technology is one of the preferred gasification technologies for the present invention because of its high methane content in the syngas, the handling of fines and large amounts of tars and oils co-produced with the syngas could be problematic and costly.

Fluid bed gasification technologies such as KRW and UGAS have not been commercially operated on a scale large enough but could be used with the present invention.

Entrained flow gasification technologies include E-Gas—two stage slurry feed technology (ConocoPhillips), Texaco—single stage slurry feed technology (General Electric), and Shell—single stage dry feed technology (Shell). The General Electric (GE) and ConocoPhillips technologies have commercial operating experience on a variety of carbonaceous feedstock including coal and petroleum coke.

In the reaction zone of the gasification reactor, the contents will commonly reach temperature in the range of 1,700° F. to about 3,000° F., and more typically in the range of about 2,000° F. to about 2,800° F. Pressure will typically be in the range of about 14.7 psia (atmospheric) to about 1500 psia, and more typically in the range 300 psia to 1200 psia.

In a typical gasification process the synthesis gas will substantially comprise of hydrogen ($H_2$), carbon monoxide (CO) and lesser quantities of methane, water, carbon dioxide ($CO_2$), carbonyl sulfide (COS) and hydrogen sulfide ($H_2S$). The syngas is commonly treated to remove or significantly reduce impurities such as $H_2S$, COS and $CO_2$ before being utilized in down stream processes. A number of acid gas removal (AGR) systems are commercially available. Selection of AGR system will depend on the degree of sulfur compounds and $CO_2$ removal required, and by the operating pressure of the AGR system. Suitable commercial chemical and physical solvent-based absorption processes may include amine-based processes such as methyldiethanolamine (MDEA) or activated MDEA technologies and physical solvent-based technologies commercialized under the trade names of Selexol, Morphysorb, Rectisol, Ucarsol, Purisol, and Fluor Solvent.

B. Power and Steam (IGCC)

Electric power can be generated efficiently in integrated gasification combined cycle (IGCC) systems. For IGCC application, the syngas produced in the gasifier after heat recovery and appropriate cleanup is fired as a fuel to the gas turbine system that drives a generator to produce electric power. Hot turbine exhaust can be passed to a heat recovery steam generation (HRSG) system to produce high pressure steam which can be expanded through a steam turbine to drive another electric generator to produce additional power. Such IGCC systems, if economically justified, can be appropriately integrated with the air separation units (ASU) to send diluent nitrogen from the ASU to the gas turbine and optionally compressed air from the gas turbine compressor to the ASU according to established procedure known in the art.

C. SNG Conversion

Conversion of gasification produced syngas to pipeline quality synthetic or substitute natural gas (SNG) is an established technology. In the 1970's concerns over a potential shortage of natural gas fostered considerable interest in the production of SNG from coal. A number of large-scale projects were planned of these projects only one large-scale commercial plant—the Great Plains Synfuels Plant located near Beulah, N. Dak. was ever built. The increased availability of cheaper North American natural gas in the 1980s and 1990s ended interest in large-scale production of SNG from coal. However, small-scale SNG production from LPG and naphtha has found a niche market in Japan and elsewhere where they provide backup fuel for natural gas based power generation.

The Great Plains facility, which started SNG production in early 1980s, uses about 18,500 tpd of lignite coal in 14 moving bed type Lurgi Mark IV gasifiers to produce about 170 MMscfd of SNG. Including planned and unplanned outages, the average annual plant loading factor is typically about 90-92%. This plant also produces up to 1,150 tpd of anhydrous ammonia and about 95 MMscfd of $CO_2$. The $CO_2$ is compressed and delivered through a 205-mile pipeline to EnCana Corp.'s oilfields near Weyburn, Saskatechewan, Canada for use in enhanced oil recovery (EOR) [5].

The process of methanation of gases containing CO and hydrogen is well known in the art (see references 1 and 2 below). Typically, the raw syngas exiting the gasifier is first taken to a heat recovery boiler and then to preliminary cleanup to substantially, remove particulates, fines, tars and liquids (if any) along with other trace impurities such as chloride, ammonia and HCN that may be present in the raw gas. The $H_2/CO$ ratio of the raw gas is substantially below the necessary minimum ratio of 3/1 typically required for methanation. The desired $H_2/CO$ ratio is obtained either by very careful choice and control of the processing conditions, difficult to achieve in continuous processing operations, or by the treatment of the portion of the syngas in a shift conversion reactor to produce a $H_2/CO$ ratio substantially in excess of 3/1 and then blending the shifted syngas with the un-shifted portion to produce the desired $H_2/CO$ ratio. The mixed stream is then cooled to about 100 F and sent to the AGR unit where $CO_2$ and sulfur compounds are removed by conventional means such as treatment with a suitable physical or chemical solvent-based process, for example Rectisol, Selexol or MDEA technologies. The residual $CO_2$ concentration of the mixed stream prior to entering the methanation reactor is typically maintained at or below 2 mol % to meet required inert specs in final product SNG. Sulfur species in the mixed stream are also removed to substantially under 5 ppm, e.g., to less than about 1 ppm, preferably to less than 0.2 ppm to protect the methanation catalyst from poisoning by such sulfur impurities.

The hydrogen-rich syngas exiting the AGR unit is sent to the methanation reactor that may consist of multiple catalytic fixed beds arranged in series, typically containing high-activity nickel catalyst. Catalytic hydrogenation of CO to produce methane is very exothermic and if not controlled within the reactor, can cause sintering of the catalyst, carbon deposition on the catalyst and/or thermal cracking of product methane to CO and $H_2$. Carbon formation through thermal cracking and/or CO disproportionation in turn has a tendency to foul the catalyst bed. Also, most nickel catalysts active for the methanation reactions tend to deactivate at high temperatures. It is, therefore, important that the gas enters the catalyst bed at the lowest inlet temperature which gives an acceptable initiation reaction rate while still preventing the formation of carbonyl compound which can occur through the reaction of CO with the catalyst at temperatures below proper operating temperatures. To overcome some of these problems caused by overheating or carbonyl formation, extensive recycle streams are used as diluent to absorb some of the exothermic heat evolved. Additional measures for avoiding too high temperature in the reactor include cooling of the catalyst bed or of the reaction gases. For example direct cold gas recycle and internal cooling of the reactor by installing heat exchange surfaces. Most prior art methanation catalysts operate best in the temperature range of 500 F to 900 F.

The exothermic heat evolved during the methanation process is utilized in preheating the feed gas to methanation reactor and in producing steam for process use or power generation. Following methanation, the SNG is compressed, dried and sent to the pipeline.

D. Steam Methane Reforming (SMR)

Steam methane reforming (SMR) is a well known technology for the production of hydrogen from natural gas containing predominantly methane. It is usually carried out by supplying heat to a mixture of steam and natural gas feed while contacting the mixture with a suitable catalyst, usually nickel. In a typical SMR operation natural gas is pretreated to remove sulfur to avoid poisoning of reforming catalyst. This is accomplished by hydrogenation of organic sulfur within a hydrotreater, which converts the organic sulfur to hydrogen sulfide, followed by hydrogen sulfide in a chemisorbent bed, utilizing for example, a zinc oxide sorbent. The desulfurized feed is then mixed with steam and reformed in the reforming reactor to produce syngas containing mainly CO, $H_2$ and $CO_2$. The hot syngas from the reformer is sent for heat recovery to generate high pressure steam and then to a shift conversion reactor in which CO reacts with water vapor at high temperatures over a suitable catalyst to form hydrogen and $CO_2$. Shifted syngas is then taken to hydrogen separation unit such as pressure swing adsorption (PSA) to produce high purity (99.9+ vol %) hydrogen. PSA tail gas is taken to the SMR furnace to burn as fuel. If needed, $CO_2$ present in the syngas stream could be removed using a suitable $CO_2$ removal process prior to taking it to the PSA unit.

A brief description of some of the prior art references is provided below.

U.S. Pat. No. 3,854,895 [1] teaches a process of producing SNG from gasification of carbonaceous feedstock. A method of treating synthesis gas in the methanation reactor to produce SNG is disclosed. SNG contains at least 88 mol % of methane and less than 2 mol % of hydrogen with remainder being $CO_2$ and $N_2$. The synthesis gas produced in the gasifier is divided into two parts to get the required $H_2$ to CO ratio in the feed to methanation reactor. No particular gasifier is discussed.

U.S. Pat. No. 4,199,327 [2] discloses an integrated process in which a non-slagging fixed bed and a slagging type entrained flow gasifiers are used to convert coal to synthesis gas. The synthesis gas is cleaned and used for power, methanol, SNG and chemical feedstock production. Use of two-different type of gasifier in the same process scheme is unique.

U.S. Pat. No. 4,483,691 [3] discloses method for syngas generation in a non-slagging gasifier. The solids and liquid hydrocarbon byproducts present in the raw syngas are removed and subjected to catalytic partial oxidation to produce secondary syngas. Effluent from the catalytic partial oxidation reactor is taken to steam reforming. Acid gases are removed from the syngas and clean syngas is converted to SNG in a methanation reactor.

U.S. Pat. No. 6,676,716 B2 [4] discloses an integrated process scheme in which waste materials are gasified in a fluidized bed gasifier at relatively low temperature to produce syngas. The syngas and the char produced from the gasifier are then used to produce power, F-T liquids, methanol or SNG.

Perry, M. and Eliason, D., "$CO_2$ Recovery and Sequestration at Dakota Gasification Company", Paper presented at Gasification Technologies Conference, San Francisco, Calif. (October 2004) [5] provides process description for Great Plains SNG plant with $CO_2$ removal and $CO_2$ transportation to an EOR site. Hydrogen and power is not produced in this plant.

Gray, D., Salerno, S, and Tomlinson, G., "Polygeneration of SNG, Hydrogen, Power and Carbon Dioxide from Texas Lignite", Report Prepared by Mitretek for NETL, U.S. Department of Energy (December 2004) [6] presents integrated concepts for poly-generation of SNG, hydrogen, power and $CO_2$ from gasification of Texas lignite coal. Reliability of hydrogen production and gasification-SMR integration is not addressed.

Miller, C. L., Schmetz, E. and Winslow, J., "Hydrogen from Coal Program—Research Development and Demonstration Plan", Draft Report Prepared by NETL, U.S. Department of Energy (September 2005) [7] describes various possible pathways for hydrogen production from coal under the U.S. Department of Energy's futuregen program. SMR integration with gasification is mentioned in the context of hydrogen production but no details are provided.

SUMMARY OF THE INVENTION

This invention is a process and system for providing hydrogen at a high level of reliability from a gasification system by integrating it with SMR. Carbonaceous feedstock such as petroleum coke or coal or biomass is gasified to co-produce SNG, fuel gas, hydrogen, power and steam in conjunction with hydrogen production through steam methane reforming. Carbon dioxide may also be recovered in this process. The integrated schemes are designed in a way that maximizes the reliability of production of high value products such as hydrogen through gasification and minimizes the impact of high natural gas prices on hydrogen production by SMR. The following scenarios are embodiments of the present invention:

Scenario 1 (FIG. 2) is comprised of gasification with electric power, steam, syngas and SNG plus hydrogen off-takes. Hydrogen is produced by combination of SMR and recovery from gasification. The SMR could be run using SNG or a mixed stream of SNG and syngas off takes from gasification with natural gas backup. The mixed stream may contain up to 90% of syngas on a volume basis. This scenario attempts to balance the reliability of SMR hydrogen with the additional economic benefits of gasification-produced hydrogen.

Scenario 2 (FIG. 4) is comprised of gasification with electric power, steam, syngas and SNG off-takes. Hydrogen is produced using SMR with SNG or a mixed stream of syngas and SNG off-takes from gasification as primary feedstock with natural gas as backup. As in scenario-1, the mixed stream may contain up to 90% of syngas on volume basis. Under this scenario the intent is to maximize hydrogen supply reliability while still taking the advantage of economic benefits of gasification.

Scenario 3 (FIG. 6) is comprised of gasification with electric power, steam, syngas and SNG off-takes. Syngas off-take is divided into two portions. One portion of the syngas is mixed with SNG to provide SMR feed and the other portion is mixed with the SMR-derived syngas prior to the SMR shift reactor. Combined shifted gas is taken to PSA to produce high purity hydrogen. The tail gas from the PSA is divided into two portions. One portion is used as fuel for SMR radiant section and the other is used as fuel for direct firing in the SMR convective section in a manner similar to practiced in supplemental firing of HRSG in combined cycle power plants. Under this scenario the intent is to run the SMR furnace at 40-60% of its design capacity and making most of the hydrogen using gasification-derived syngas. When gasifier is down, SMR could be brought back to run at its full capacity with backup natural gas. Under this scenario the intent is to maximize hydrogen supply reliability and minimize loss in energy efficiency due to syngas to SNG conversion while still taking the advantage of economic benefits of gasification.

Scenario 4 (FIG. 8) is the same as scenarios 1 that also include synthetic fuel gas off-take which has a heating value in the range of 250-600 btu/scf. The Btu content of the fuel gas could be varied by blending gasification produced syngas and SNG in different proportions. This scenario attempts to exploit the site synergies that may exist where synthetic fuel gas could be used as a replacement fuel for natural gas such as in steel or glass manufacturing industries.

Scenario 5 (FIG. 10) is the same as scenario 2 and 3 that also include synthetic fuel gas off-take in a manner similar to described in scenario 4.

In each of the above scenarios, a crude $CO_2$ stream of 97+% purity is produced that could be dehydrated, compressed and delivered to an EOR or a sequestration site.

The process flow sheet in Scenarios 1 to 5 described above could be arranged in the following two ways:

a) Low $CO_2$ capture mode (referring to FIGS. 2, 4, 6, 8, and 10)—under this scheme the raw syngas after heat recovery and preliminary cleanup is first desulfurized and then divided into three parts. The first part is taken for power and steam generation, the second part is bypassed and the third part is taken to a shift reactor. The shifted syngas, after heat recovery and water knockout, is combined with the bypassed stream and then taken to a $CO_2$ and residual sulfur removal system to achieve required $CO_2$ and sulfur specs in the syngas. The syngas stream exiting the $CO_2$ removal unit is taken for further processing as described in scenarios 1 to 5.

b) High $CO_2$ capture mode (referring to FIGS. 3, 5, 7, 9, and 11)—under this scheme the raw syngas, after heat recovery and preliminary cleanup, is divided into two parts. The first part is taken to a sour shift reactor and the second part is bypassed. The shifted syngas is combined with the bypassed stream and the mixed stream, after heat recovery and water knockout, is taken to a 2-stage acid gas removal system to achieve required $CO_2$ and sulfur specs in the syngas. The syngas stream exiting the $CO_2$ removal unit is divided into two parts. The first part is taken for power and steam generation and the second part is taken for further processing as described in scenarios 1 to 5.

In any of the above scenarios refinery off-gases could effectively be utilized to convert them to higher value products. In one embodiment, the ConocoPhillips E-Gas gasifier, which is one of the preferred gasification technologies to be used with this invention, is generally designed to use recycled raw syngas to quench the gas leaving the second stage of the gasifier. This quenched syngas is then held at about 1800° F. for sufficient time in a non-catalytic reactor vessel for the gas to approach thermodynamic equilibrium. Refinery off-gases could be used in place of the recycled syngas resulting in a 5% to 10% increase in syngas production. The syngas leaving the gasifier would be essentially the same composition of the raw syngas without the addition of refinery off-gases. The issue associated with the sulfur content variation of the refinery off-gases would be easily managed by appropriately modifying the design of the acid gas removal system required for processing the raw syngas downstream of the gasifier. The process of the present invention is comprised of the steps set forth in the Table 1.

TABLE 1

Summary of the invention

| | Scenarios | | | | |
|---|---|---|---|---|---|
| | 1 | 2 | 3 | 4 | 5 |
| a) Gasification of a carbonaceous material to form a synthesis gas | x | x | x | x | x |
| b) Dividing the synthesis gas into two portions | x | x | x | x | x |
| c) Generating electricity by fueling at least one gas turbine with a first portion of the synthesis gas, and/or generating electricity by expanding steam in a steam turbine | x | x | x | x | x |
| d) Processing the second portion of synthesis gas to form treated synthesis gas | x | x | x | x | x |
| e) Dividing the treated synthesis gas into two or more portions | x | x | x | x | x |
| f) Producing synthetic natural gas by converting a first portion of the treated synthesis gas | x | x | x | x | x |
| g) Producing hydrogen by feeding at least a portion of synthetic natural gas alone or mixed with a portion of treated synthesis gas to a steam methane reforming process | x | x | x | x | x |
| h) Recovering hydrogen from a second portion of the treated synthesis gas by further processing in a shift reactor and a PSA | x | | | x | |

TABLE 1-continued

Summary of the invention

| | Scenarios | | | | |
|---|---|---|---|---|---|
| | 1 | 2 | 3 | 4 | 5 |
| i) Optionally recovering hydrogen from a portion of the treated synthesis gas from step (e) by feeding it to a shift reactor within steam methane reforming process | | | x | | x |
| j) Optionally producing fuel gas by mixing a portion of synthetic natural gas and a portion of treated synthesis gas from step (e) | | | | x | x |
| k) Producing steam by recovering at least a portion of the heat released by exothermic reactions in the gasification, synthetic natural gas production, hydrogen production, hydrogen recovery and electricity generation steps | x | x | x | x | x |
| l) Optionally recovering carbon dioxide from a waste gas stream produced in step (d) and/or from the feed to a PSA unit within the steam methane reforming process | x | x | x | x | x |

BRIEF DESCRIPTION OF THE DRAWINGS

For a more complete understanding of the present, invention and the advantages thereof, reference should be made to the following Detailed Description taken in conjunction with the accompanying drawings in which.

Figure 1:
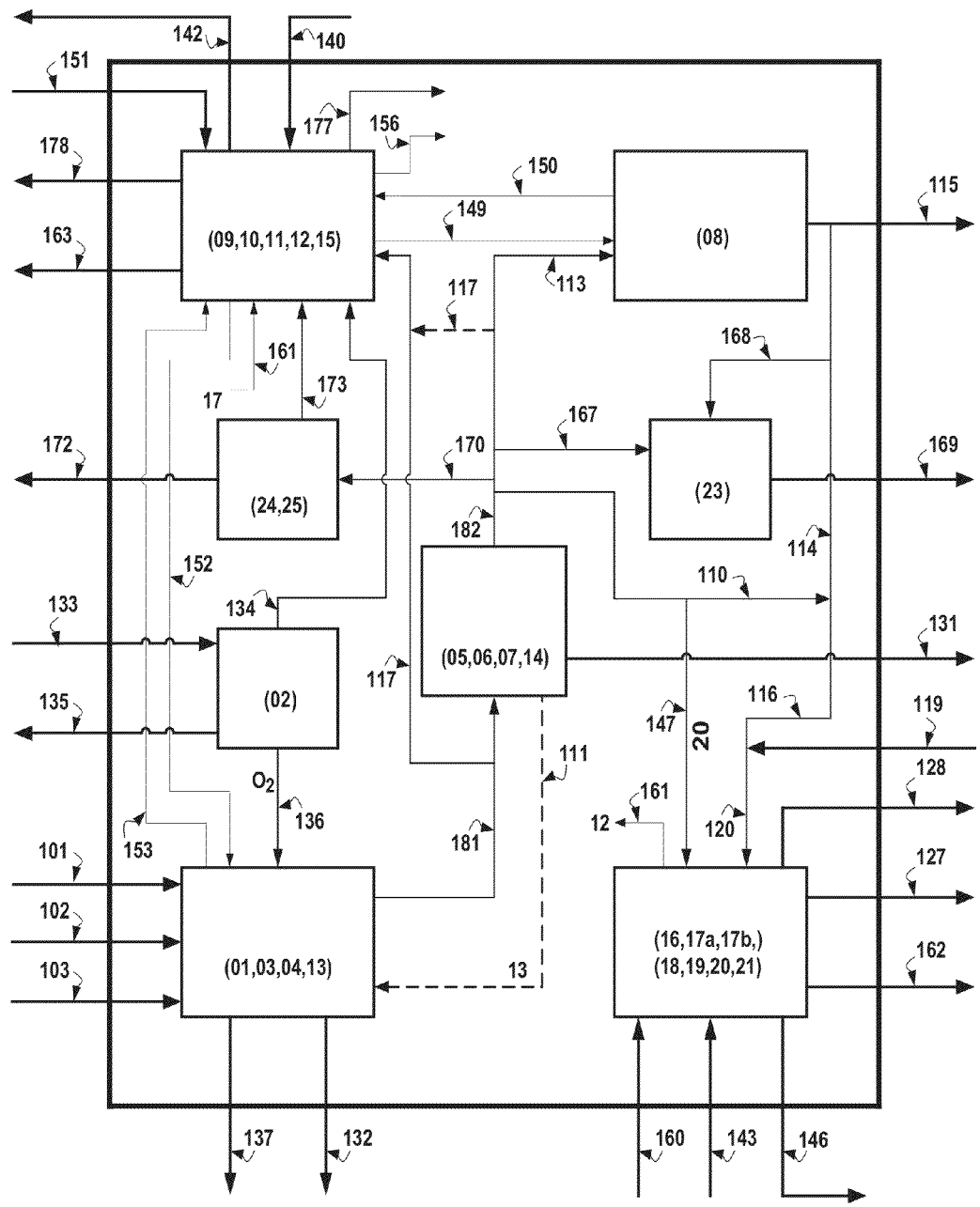
FIG. 1 is a diagram that represents a summary of the concept of high reliability poly-generation system that integrates gasification with SMR for the production of hydrogen, SNG, fuel gas, steam and power with the option of $CO_2$ removal.

For purposes of clarity of the drawings and specification, the following table identifies reference Numerals used in the drawings and the corresponding description.

TABLE

LISTING OF ELEMENTS

| Reference No. | Description |
|---|---|
| 01 | Feed Preparation |
| 02 | Air Separation Unit (ASU) |
| 03 | Gasification |
| 04 | Cleanup and Heat Recovery |
| 05 | Shift Conversion |
| 06 | $CO_2$/Acid Gas Removal |
| 07 | Sulfur Guard-Bed |
| 08 | Methanation, Heat Recovery and Drying |
| 09 | Fuel Gas Saturation |
| 10 | Gas Turbine/Generator |
| 11 | HRSG |
| 12 | Steam Turbine/Generator |
| 13 | Sulfur Recovery/Tail Gas Cleanup |
| 14 | $CO_2$ Drying and Compression |
| 15 | Boiler Feed Water & Cooling Water Systems (Gasification) |
| 16 | Boiler Feed Water & Cooling Water Systems (SMR) |
| 17 | SMR |
| 17a | SMR (Convective) |
| 17b | SMR (Radiant) |
| 18 | Sulfur Guard-Bed |
| 19 | Heat Recovery Boiler |
| 20 | Shift Conversion |
| 21 | CO2 Removal/Drying And Compression |
| 22 | Hydrogen PSA |
| 23 | Fuel Gas Mixing |
| 24 | Shift Conversion |
| 25 | Hydrogen PSA |
| 101 | Carbonaceous Feedstock |
| 102 | Flux |
| 103 | Makeup Water |
| 104 | Slurry |
| 105 | Syngas (SNG) |
| 106 | Syngas (SNG) |
| 107 | Syngas (SNG) |
| 108 | Syngas (SNG) |
| 109 | Syngas (SNG) |
| 110 | Syngas (SNG) |
| 111 | Acid Gas |
| 112 | CO2 |
| 113 | Syngas (SNG) |
| 114 | Syngas (SNG) |
| 115 | Syngas (SNG) |
| 116 | Syngas (SNG) |
| 117 | Syngas (SNG) |
| 118 | Fuel Gas |
| 119 | Natural Gas Backup |
| 120 | Syngas (SNG)/Natural Gas |
| 121 | Feed Gas |
| 122 | Feed Gas |
| 123 | Feed Gas |
| 124 | Feed Gas |
| 125 | Syngas (SNG) |
| 126 | Syngas (SNG) |
| 127 | Hydrogen |
| 128 | CO2 |
| 129 | PSA Tail Gas |
| 130 | CO2 |
| 131 | CO2 |
| 132 | Sulfur |
| 133 | Air |
| 134 | Nitrogen |
| 134 | Air Separation Unit (Nitrogen) |
| 135 | Vent |
| 136 | Oxygen |
| 137 | Slag |
| 138 | Air/Oxygen |
| 139 | Vent |
| 140 | Air |
| 141 | Fuel Gas |
| 142 | Flue Gas |
| 143 | Air |
| 144 | Air |
| 145 | Air |
| 146 | Flue Gas |
| 147 | Syngas (SNG) |
| 149 | BFW |
| 150 | Hydrogen |
| 151 | Makeup Water |
| 152 | BFW |
| 153 | Steam |
| 154 | Fuel Gas |
| 155 | Water |
| 156 | Steam |
| 157 | Steam |
| 158 | Steam |
| 159 | Steam |
| 160 | Makeup Water |
| 161 | Steam |
| 162 | Steam |
| 163 | Steam |
| 164 | Steam |
| 165 | Steam |
| 166 | Steam |
| 167 | Snyngas (SNG) |
| 168 | Snyngas (SNG) |
| 169 | Fuel Gas |
| 170 | Snyngas (SNG) |
| 171 | Snyngas (SNG) |
| 172 | Hydrogen |
| 173 | PSA Tail Gas |

TABLE-continued

LISTING OF ELEMENTS

| Reference No. | Description |
|---|---|
| 175 | Power |
| 176 | Power |
| 177 | Power |
| 178 | Power |
| 180 | Refinery Off-Gas |
| 181 | Syngas (SNG) |
| 182 | Syngas (SNG) |

DETAILED DESCRIPTION OF THE INVENTION

This invention is a process and system for providing hydrogen at a high level of reliability from a gasification system by integrating it with SMR. Carbonaceous feedstock such as petroleum coke or coal or biomass is gasified to co-produce SNG, fuel gas, hydrogen, power and steam in conjunction with hydrogen production through steam methane reforming. Carbon dioxide may also be recovered in this process. The integrated schemes are designed in a way that maximizes the reliability of production of high value products such as hydrogen through gasification and minimizes the impact of high natural gas prices on hydrogen production by SMR.

The present invention describes a process for providing hydrogen at a high level of reliability from a gasification system comprising:
a) gasification of a carbonaceous material to form a synthesis gas;
b) dividing the synthesis gas into a first portion and a second portion;
c) fueling an at least one gas turbine with the first portion of the synthesis gas and/or expanding steam in a steam turbine to generate electricity;
d) processing the second portion of synthesis gas to form a treated synthesis gas;
e) dividing the treated synthesis gas into two or more portions;
f) conversion of a first portion of the treated synthesis gas to synthetic natural gas; and
g) feeding at least a first portion of the synthetic natural gas to a steam methane reforming process to produce hydrogen, wherein the synthetic natural gas is optionally mixed with a second portion of the treated synthesis gas;
wherein steps (a), (c), (f), and (g) are exothermic reactions resulting in release of heat; and
h) recovering at least a portion of the heat released by the exothermic reactions to produce steam.

FIG. 1 represents a summary of the present invention that integrates multiple processes, including a gasification unit, to produce a syngas stream comprised predominantly of $H_2$ and CO with some methane 181, an air separation unit (ASU) for primary production of high purity oxygen 136 for use in the gasification process, a syngas processing unit that adjust the $H_2$/CO ratio in the syngas and removes acid gases to produce $H_2$-rich syngas stream 182, a SNG unit that converts a cleaned syngas stream 182 to a stream containing predominantly methane with a small amount of residual hydrogen and inerts 115, a power generation unit to produce electricity 177, 178 and steam 163, and a SMR unit for producing hydrogen 127 and steam 162 using SNG 114 or a mixed stream of syngas and SNG 116 as a primary feedstock. The integration is done in a way that maximizes the reliability of supply of high-value products such as hydrogen through gasification and minimizes the exposure of hydrogen prices to high natural gas prices. The integrated process presented in this invention could be implemented in two different ways:

1. Low $CO_2$ capture mode (referring to FIGS. 2, 4, 6, 8, and 10)—under this scheme the raw syngas after heat recovery and preliminary cleanup is first desulfurized and then divided into three parts. The first part is taken for power and steam generation, the second part is bypassed and the third part is taken to a shift reactor. The shifted syngas, after heat recovery and water knockout, is combined with the bypassed stream and then taken to a $CO_2$ and residual sulfur removal system to achieve required $CO_2$ and sulfur specs in the syngas. The syngas stream exiting the $CO_2$ removal unit is taken for further processing.
2. High $CO_2$ capture mode (referring to FIGS. 3, 5, 7, 9, and 11)—under this scheme the raw syngas, after heat recovery and preliminary cleanup, is divided into two parts. The first part is taken to a sour shift reactor and the second part is bypassed. The shifted syngas is combined with the bypassed stream and the mixed stream, after heat recovery and water knockout, is taken to a 2-stage acid gas removal system to achieve required $CO_2$ and sulfur specs in the syngas. The syngas stream exiting the $CO_2$ removal unit is divided into two parts. The first part is taken for power and steam generation and the second part is taken for further processing.

Figure 2:
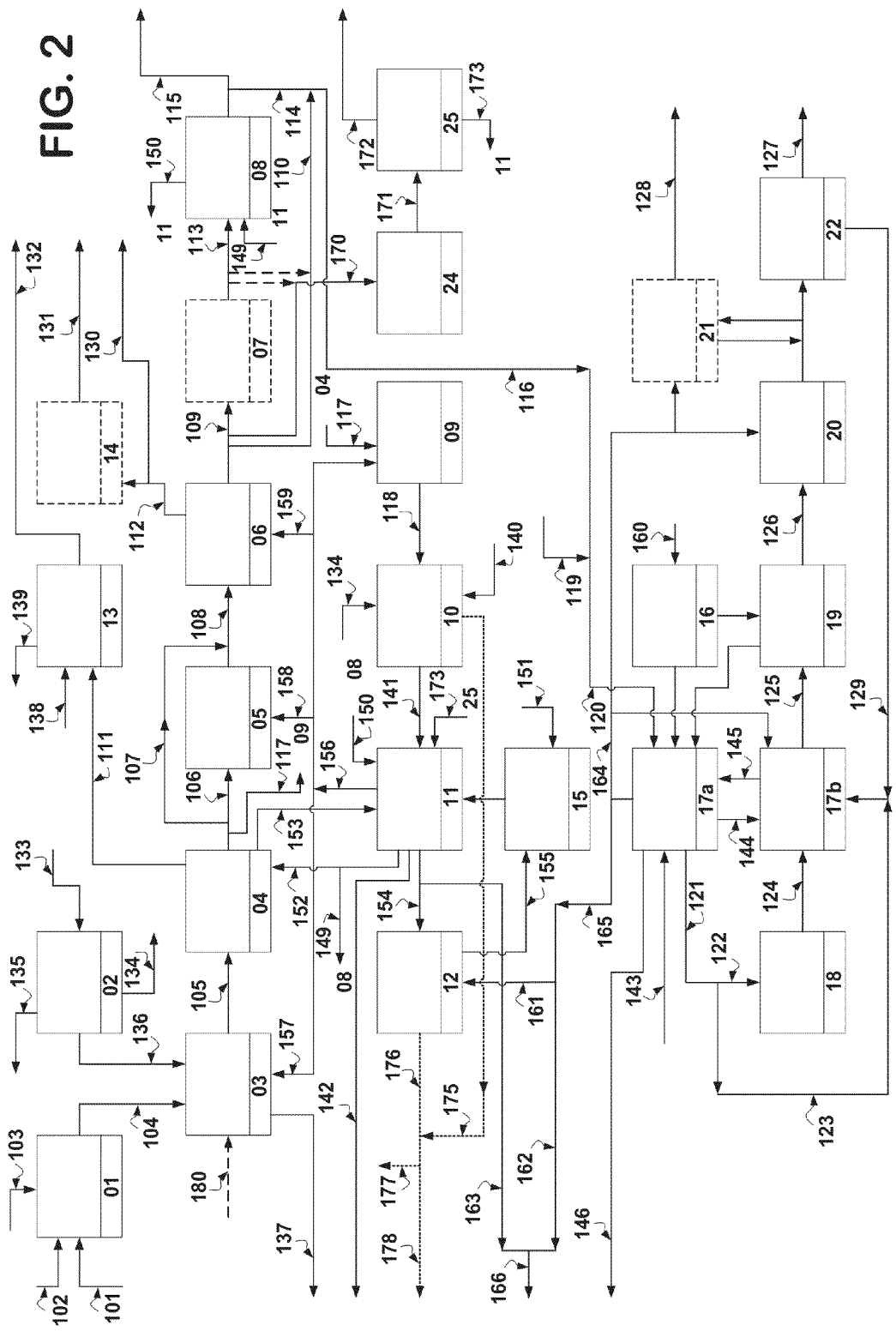
FIG. 2 is a diagram that represents an embodiment of the present invention (Scenario 1), which comprises gasification with electric power, steam, syngas and SNG plus hydrogen off-takes. Hydrogen is produced by combination of SMR and recovery from gasification. SMR-hydrogen is produced using SNG or a mixed stream of syngas and SNG off-takes from gasification. In this scenario, the sulfur containing species ($H_2S$ and COS) are removed before the shift conversion.

FIG. 2 shows the preferred embodiment of the present invention. In this scenario, the carbonaceous fuel 101 is first obtained and prepared for feeding 01 to the gasifier with or without the fluxing agent 102. In slagging type gasifiers, operating with petroleum coke or coal, typically about 1 to 5 wt % lime stone (or any other suitable fluxing agent) is added with the feed to reduce ash melting or fusion temperature. Depending on the technology used, the feed preparation 01 of solid feedstock such as coal or petroleum coke may involve crushing or grinding of the raw feed to a required size distribution and then feeding it to the gasifier either as a dry feed through a lock-hopper system such as in Lurgi or BGL gasifiers or as an aqueous slurry, typically containing about 30-40 wt % water, as in E-Gas or GE (or Texaco) gasifiers. High purity oxygen 136 containing about 99.5 mol % $O_2$ is produced in the ASU $O_2$ and compressed to the desired pressure and fed to the gasifier 03. The pressure in the gasifier may range from 400 to 1200 psi and more typically in the range of 800-900 psi. The high pressure raw syngas exiting the gasifier 105 is typically at 1700-1900° F. for the entrained flow gasifier and about 1000° F. for moving bed gasifiers. This hot syngas is taken to a heat recovery boiler followed by preliminary cleanup, COS hydrolysis and sulfur removal 04. After processing in the sulfur removal unit where more than 99% of the total sulfur in the raw gas is removed, the syngas is divided into three parts. The first part 117 is used for power and steam generation through combined cycle system (blocks 09-12). The power and steam generated here is sufficient for inside plant use with option to be sold to external customers. The second part of the syngas 106 is sent to a shift converter and the third part 107 is bypassed. The shifted syngas is blended with the bypassed stream and the mixed stream is then taken for low temperature heat recovery and water knockout. The flow of bypassed stream is adjusted in way to achieve desired $H_2$/CO ratio in the mixed stream 108. The syngas from the water knockout is taken to a conventional physical or chemical solvent-based $CO_2$ removal unit 06 where the $CO_2$ level in the syngas is reduced to less than 2 mol %. The syngas after $CO_2$ removal could be divided into three parts. The first part 109 is optionally taken to a sulfur guard bed for any trace sulfur removal and then to a methanation unit 08 to convert it to pipeline quality SNG containing about 94+ mol % methane and 1-2 mol % $H_2$ with remainder being the inerts comprising mainly $CO_2$, $N_2$ and argon. The second part of the $H_2$-rich syngas 110 is mixed with a portion of the SNG stream 114 and the mixed stream 116 is taken to an SMR 17 as a feedstock for hydrogen production. The portion of syngas stream 110 in the mixed stream 116 to SMR could be from anywhere from 0 to 90% on volume basis. The third part of the $H_2$-rich syngas 170 is taken to a shift conversion reactor 24 and then to a PSA unit 25 to produce high purity hydrogen 172. The PSA tail gas 173 is taken to the HRSG 11 for supplementary duct firing to produce additional steam for power generation or plant use. The excess SNG 115 which is not utilized as SMR feed is taken to the natural gas pipeline for sale or storage.

The acid gas stream 111 from the $H_2S$ removal unit is taken to a sulfur recovery unit 13 to convert almost all the $H_2S$ and COS present in the acid gas into elemental sulfur 132 which could be disposed or sold as byproduct.

The crude $CO_2$ stream 112 that may contain about 97+% $CO_2$ with a few hundred ppm of total sulfur could be dried and compressed 131 and send to a sequestration site for disposal or sold to external customers for EOR application. If $CO_2$ stream 112 is to be vented provision must be made to remove residual sulfur before venting it to atmosphere 130.

The SNG or mixed SNG plus syngas stream 116 taken to SMR is mixed with any backup natural gas stream 119 if needed and the combined stream 120 is preheated in the convective section of the SMR 17a. The preheated feed gas 121 is divided into two portions. First portion 122 is sent to the sulfur guard-bed to remove any trace sulfur species present in the feed and then to the catalytic reforming reactor where the feed gas containing methane, CO and $H_2$ reacts with steam to produce syngas 125 containing mainly CO, $H_2$ and $CO_2$. The reforming reaction is endothermic requiring heat. This heat is supplied by burning the fuel gas, comprising of the second portion of the feed gas 123 and the PSA tail gas 129, in the SMR furnace 17b using preheated air 144. The hot syngas from the reformer 125 is sent to a heat recovery boiler 19 to generate high pressure steam and then to a shift conversion reactor in which most of the CO is converted to hydrogen through water gas shift reaction. Shifted syngas is then taken to PSA unit 22 for hydrogen 127 separation. As indicated above, the PSA tail gas 129 is taken to SMR furnace to burn as fuel. Optionally, about 80-90% of the $CO_2$ 128 present in the shifted syngas stream could be removed using conventional $CO_2$ removal process 21 prior to taking it to the PSA unit. The hot flue gas 145 from the SMR furnace is used for preheating the air and the feed gas and generating high pressure superheated steam. A portion of this steam 164 is used for process including reformer, shift conversion, and $CO_2$ removal if needed and the other portion 165 could be used for power generation 161 or for export 162 to external customers.

Figure 3:
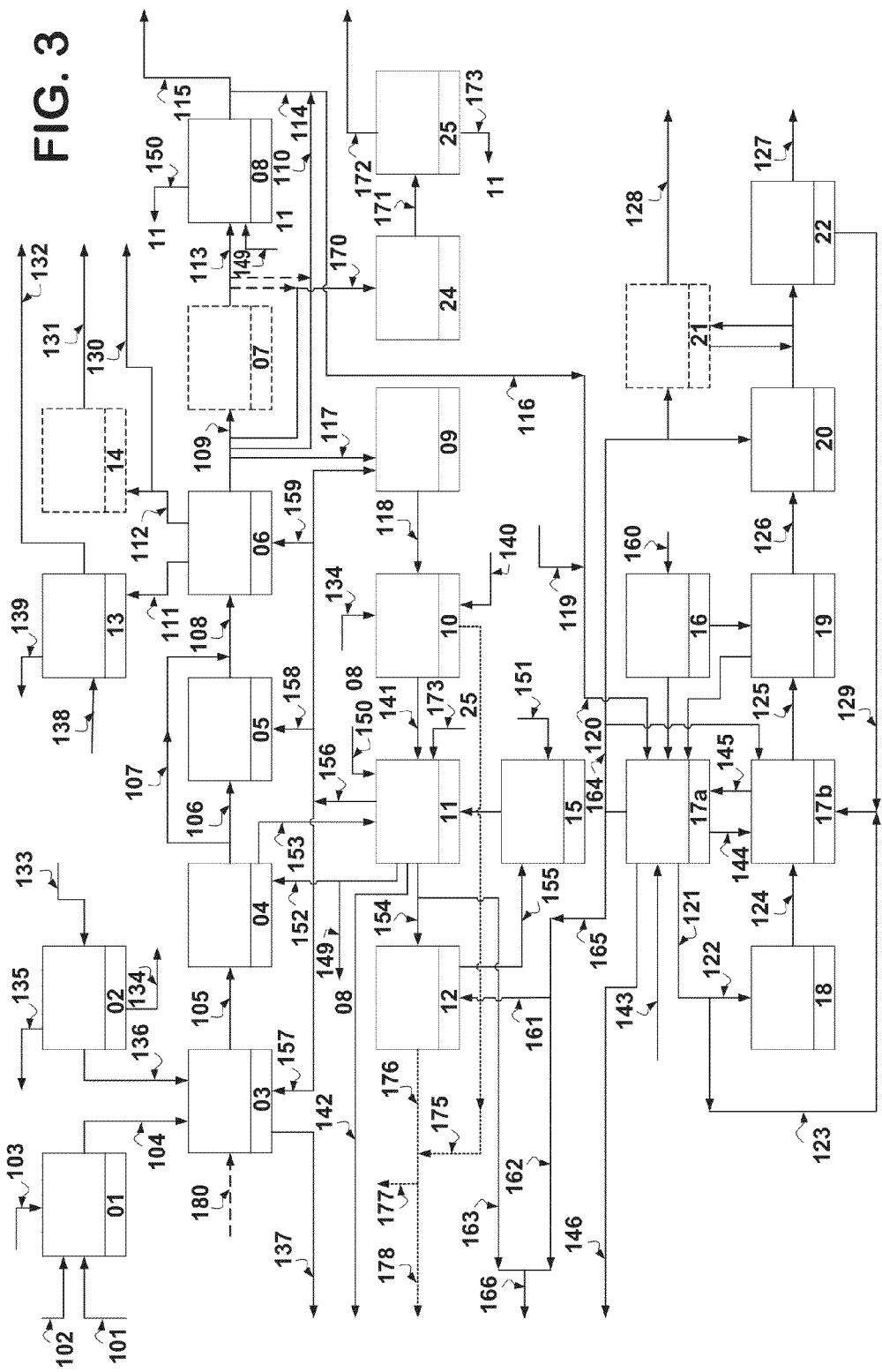
FIG. 3 is a diagram that represents an embodiment of the present invention (Scenario 1a) that is a variation of Scenario 1. In this scenario, the sulfur containing species and $CO_2$ are removed in a single process step after the shift conversion to maximize $CO_2$ removal.

FIG. 3 is another embodiment of the present invention. This embodiment is identical to the preferred embodiment as shown in FIG. 2, except in this case the sulfur species and $CO_2$ in the syngas are removed in a single process step after the shift conversion 05 to maximize $CO_2$ removal.

Figure 4:
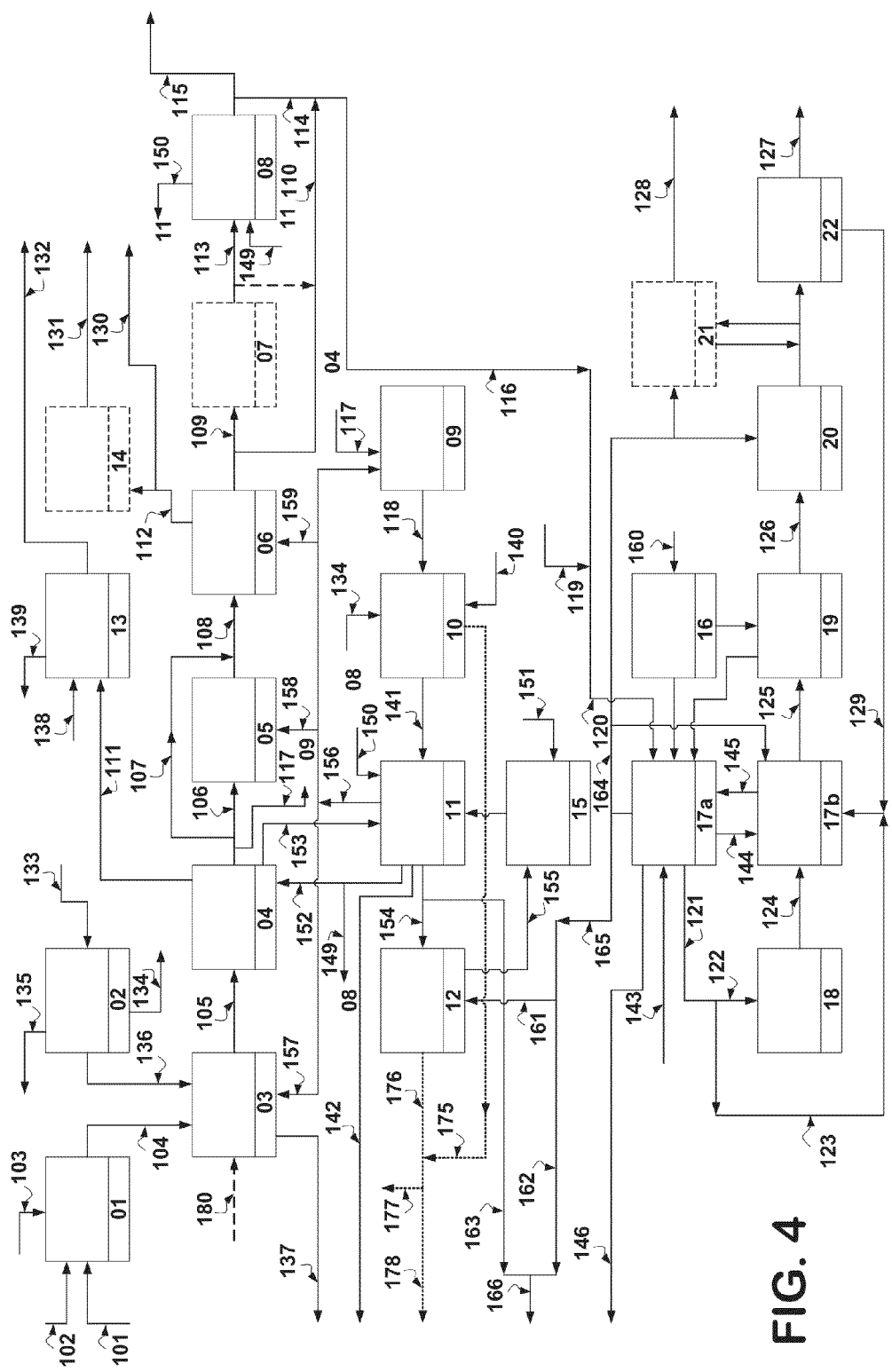
FIG. 4 is a diagram that represents an embodiment of the present invention (Scenario 2), which comprises gasification with electric power, steam, syngas and SNG off-takes. Hydrogen is produced using steam methane reforming using SNG or a mixed stream of syngas and SNG off-takes from gasification. In this scenario, the sulfur containing species ($H_2S$ and COS) are removed before the shift conversion.

FIG. 4 shows another embodiment of the present invention. In this embodiment there is no hydrogen 172 production in the gasification section of the plant. All the hydrogen required is produced using SMR in a manner similar to described in the preferred embodiment. In this scenario the sulfur containing species ($H_2S$ and COS) are removed before the shift conversion.

Figure 5:
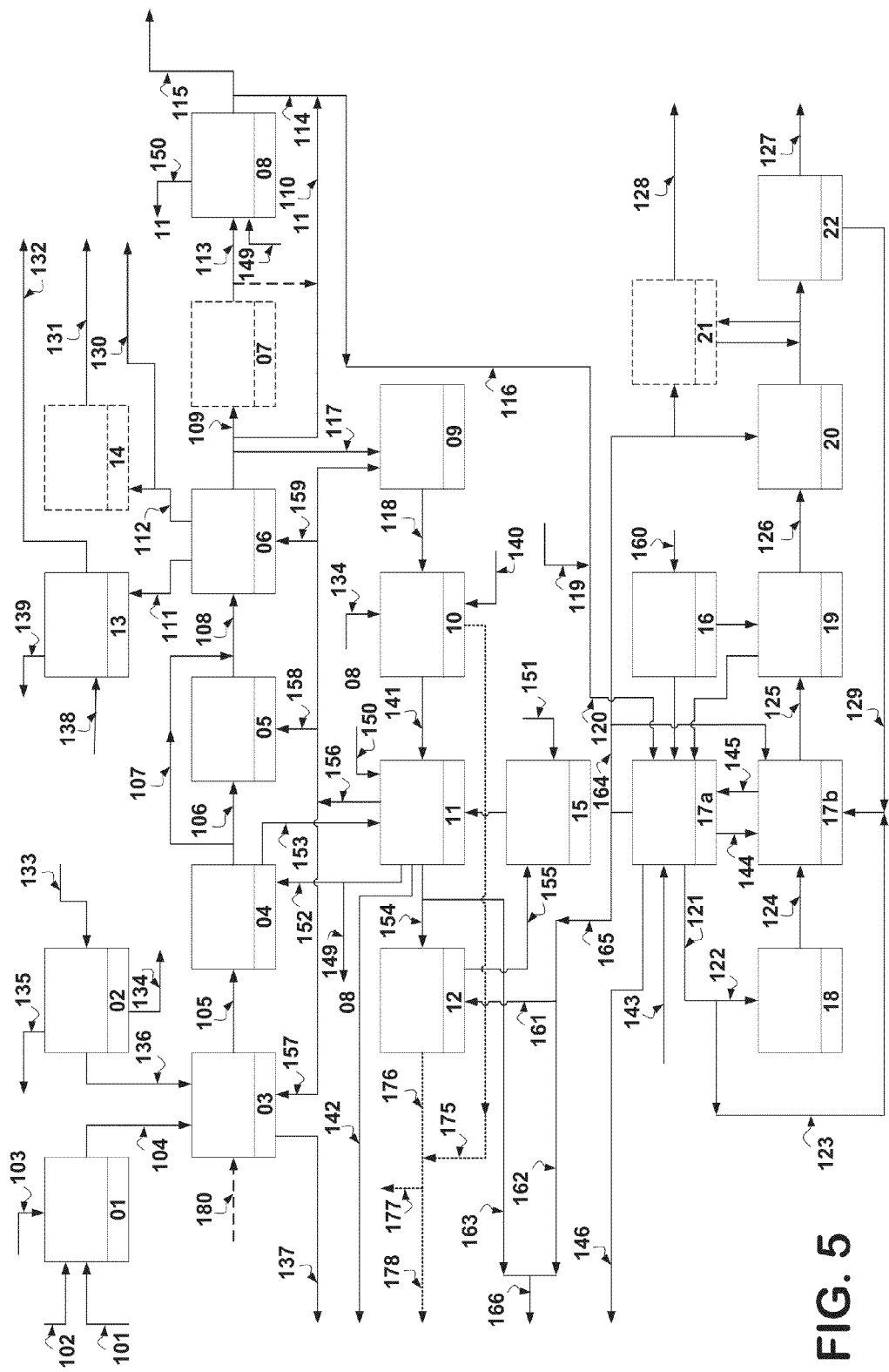
FIG. 5 is a diagram that represents an embodiment of the present invention (Scenario 2a) that is a variation of Scenario 2. In this scenario, the sulfur containing species and $CO_2$ are removed in a single process step after the shift conversion to maximize $CO_2$ removal.

FIG. 5 shows another embodiment of the present invention. This embodiment is identical to the alternate embodiment shown in FIG. 4, except in this case the sulfur species and $CO_2$ in the syngas are removed in a single process step after the shift conversion 05 to maximize $CO_2$ removal.

Figure 6:
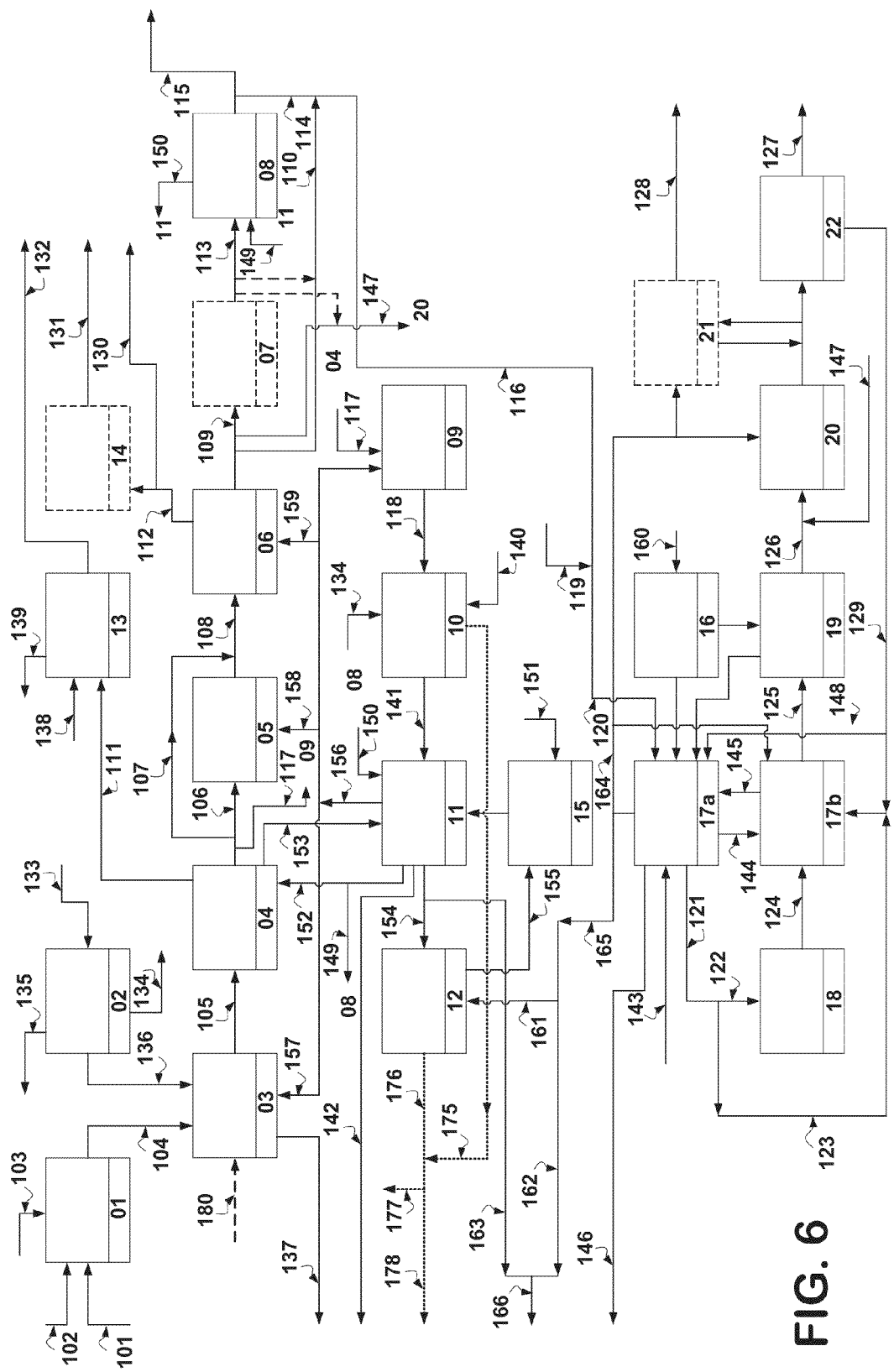
FIG. 6 is a diagram that represents an embodiment of the present invention (Scenario 3), which comprises gasification with electric power, steam, syngas and SNG off-takes. Syngas off-take is divided into two portions. One portion of the syngas is mixed with SNG to provide SMR feed and the other portion is mixed with the SMR-derived syngas prior to the SMR shift reactor. Combined shifted gas is sent to the PSA to produce high purity hydrogen. The tail gas from the PSA is divided into two portions. One portion is used as fuel for the SMR radiant section and the other is used as fuel for direct firing in the SMR convective section in a manner similar to practiced in supplemental firing of HRSG in combined cycle power plants. In this scenario the sulfur containing species ($H_2S$ and COS) are removed before the shift conversion.

FIG. 6 shows another embodiment of the present invention. In this case a portion of the syngas off-take 147 is taken to SMR section to be mixed with the SMR-derived syngas 126 prior to the SMR shift reactor 20. Combined shifted gas is then taken to PSA unit 22 to produce high purity hydrogen. The tail gas from the PSA 129 is divided into two portions. One portion is used as fuel for SMR radiant section 17b and the other is used as fuel for direct firing in the SMR convective section 17a in a manner similar to practiced in supplemental firing of HRSG in combined cycle power plants. In this scenario the sulfur containing species ($H_2S$ and COS) are removed before the shift conversion.

Figure 7:
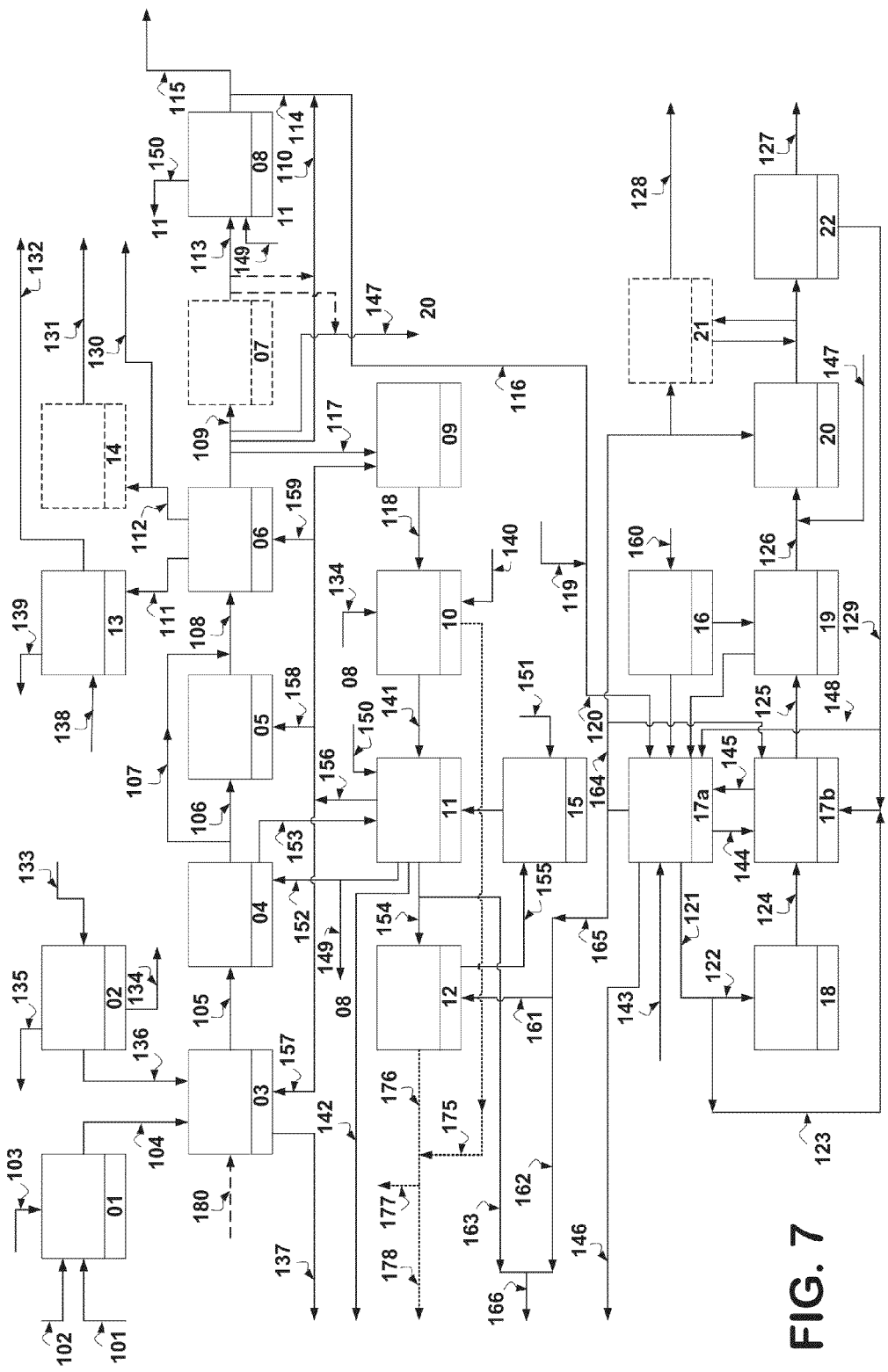
FIG. 7 is a diagram that represents an embodiment of the present invention (Scenario 3a) that is a variation of Scenario 3. In this scenario, the sulfur containing species and $CO_2$ are removed in a single process step after the shift conversion to maximize $CO_2$ removal.

FIG. 7 shows another embodiment of the present invention. This embodiment is identical to the alternate embodiment shown in FIG. 6, except in this case the sulfur species and $CO_2$ in the syngas are removed in a single process step after the shift conversion 05 to maximize $CO_2$ removal.

Figure 8:
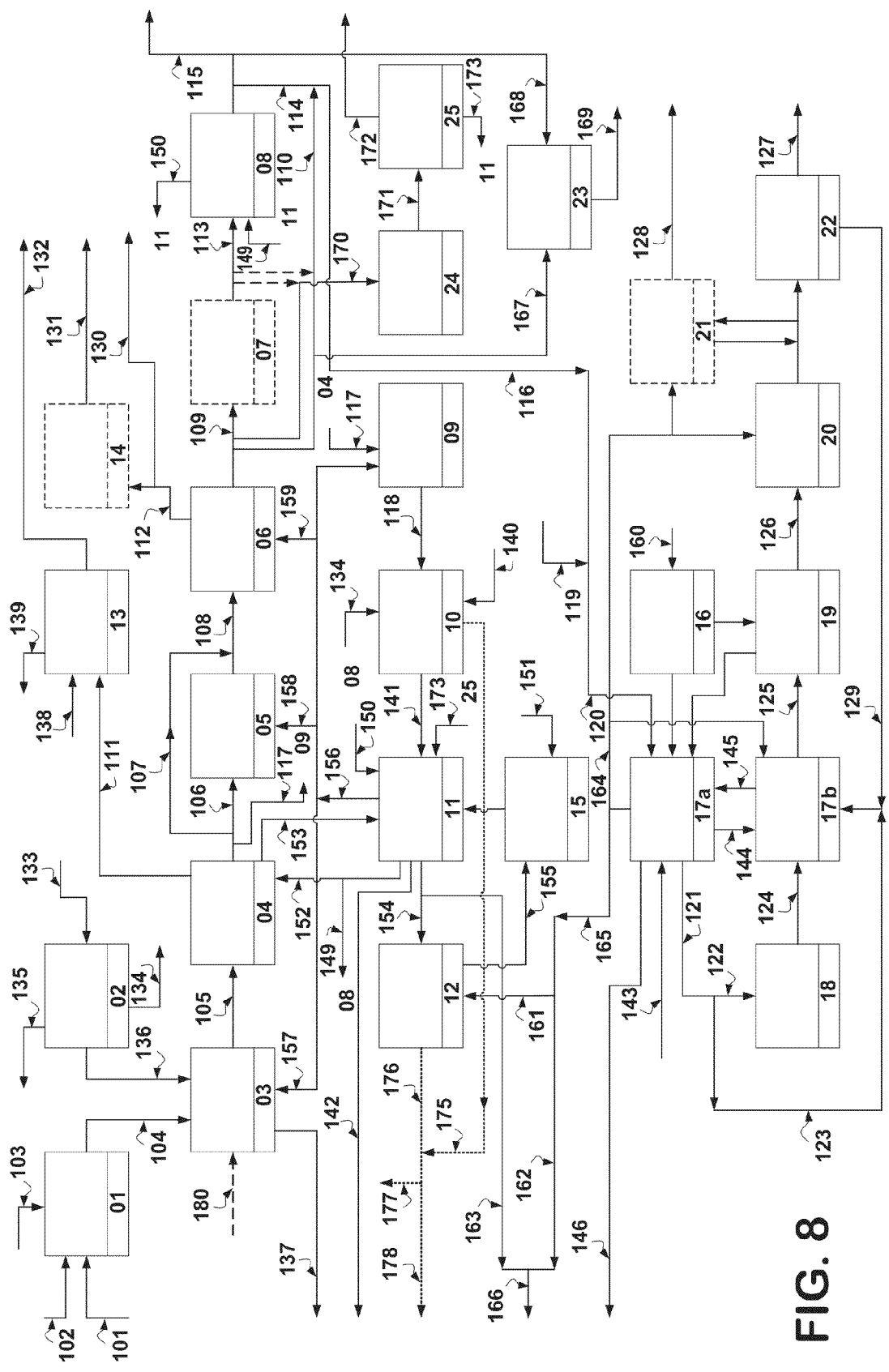
FIG. 8 is a diagram that represents an embodiment of the present invention (Scenario 4) that is a variation of Scenario 1 that further includes synthetic fuel gas off-take. In this scenario, the sulfur containing species ($H_2S$ and COS) are removed before the shift conversion.

FIG. 8 shows another embodiment of the present invention. This embodiment is identical to the preferred embodiment shown in FIG. 2 except in this case an additional product, medium Btu fuel gas 169, is produced by mixing a portion of the $H_2$-rich syngas 167 with a portion of SNG 168. In this scenario the sulfur containing species ($H_2S$ and COS) are removed before the shift conversion.

Figure 9:
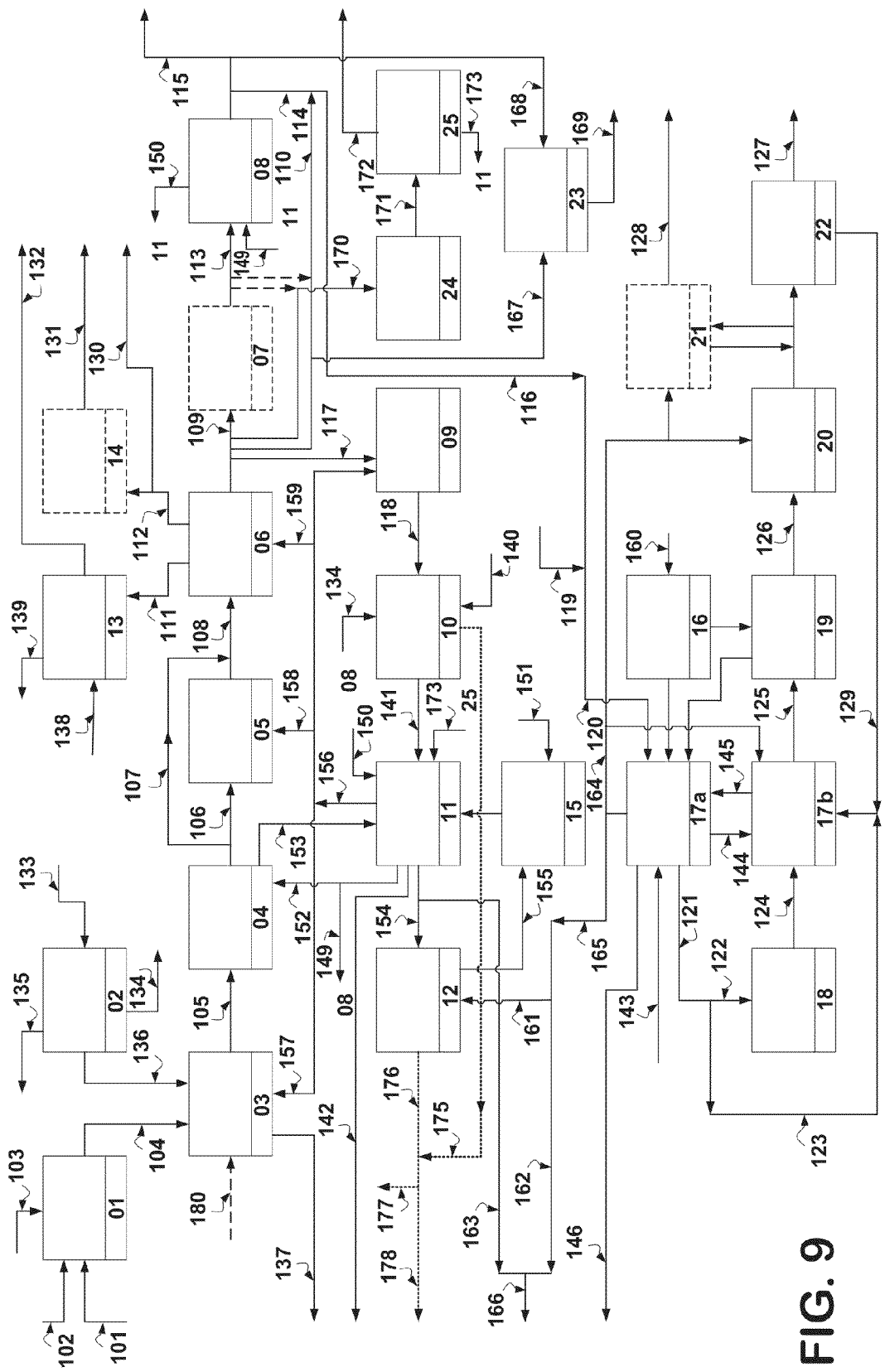
FIG. 9 is a diagram that represents an embodiment of the present invention (Scenario 4a) that is a variation of Scenario 4. In this scenario, the sulfur containing species and $CO_2$ are removed in a single process step after the shift conversion to maximize $CO_2$ removal.

FIG. 9 shows another embodiment of the present invention. This embodiment is identical to the alternate embodiment shown in FIG. 8, except in this case the sulfur species and $CO_2$ in the syngas are removed in a single process step after the shift conversion 05 to maximize $CO_2$ removal.

Figure 10:
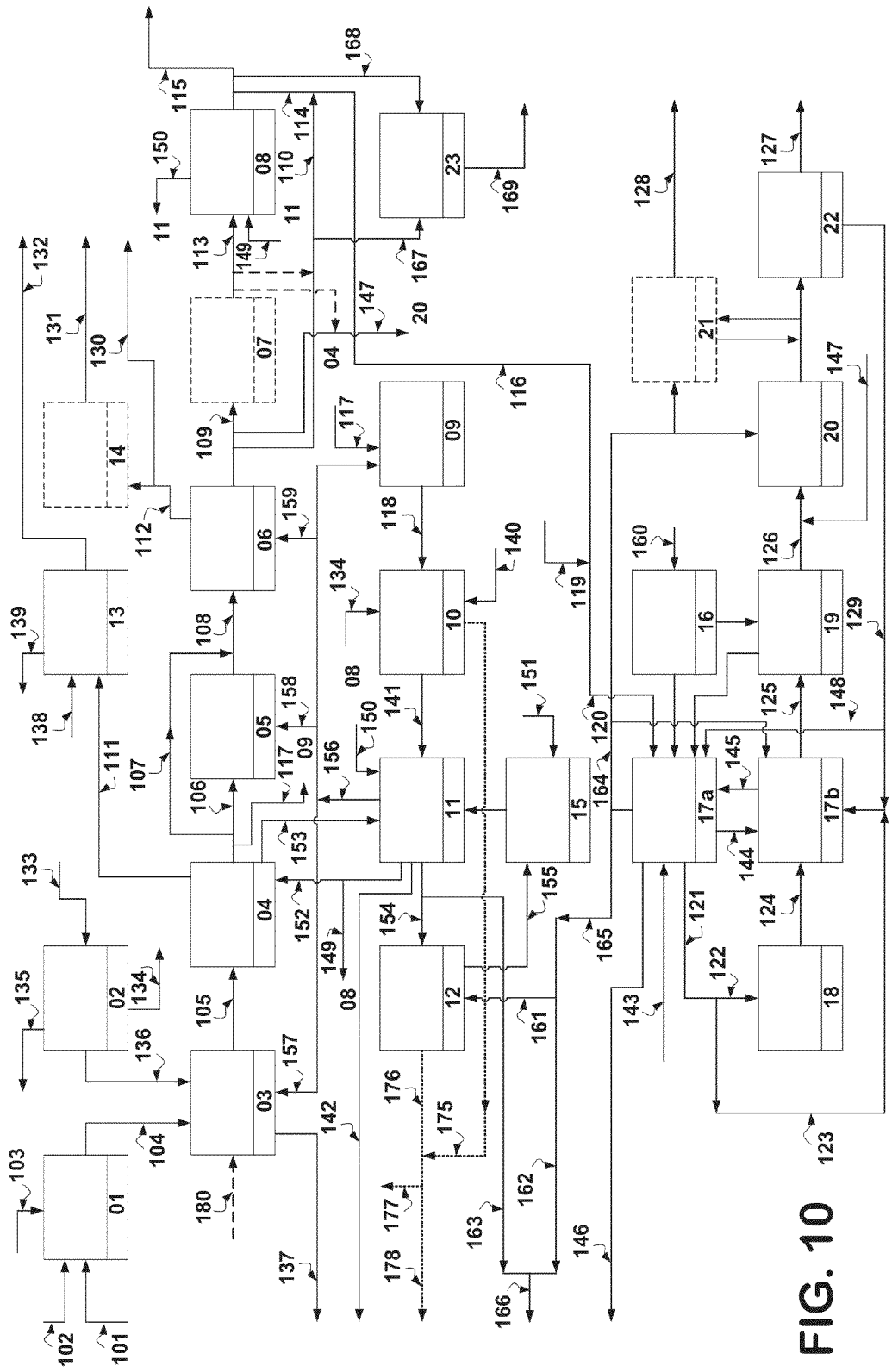
FIG. 10 is a diagram that represents an embodiment of the present invention (Scenario 5) that is a variation of Scenarios 2 and 3, which further includes synthetic fuel gas off-take. In this scenario, the sulfur containing species ($H_2S$ and COS) are removed before the shift conversion.

FIG. 10 shows another embodiment of the present invention. This embodiment is identical to the alternate embodiment shown in FIG. 6 except in this case an additional product, medium Btu fuel gas 169, is produced by mixing a portion of the $H_2$-rich syngas 167 with a portion of SNG 168. In this scenario the sulfur containing species ($H_2S$ and COS) are removed before the shift conversion.

Figure 11:
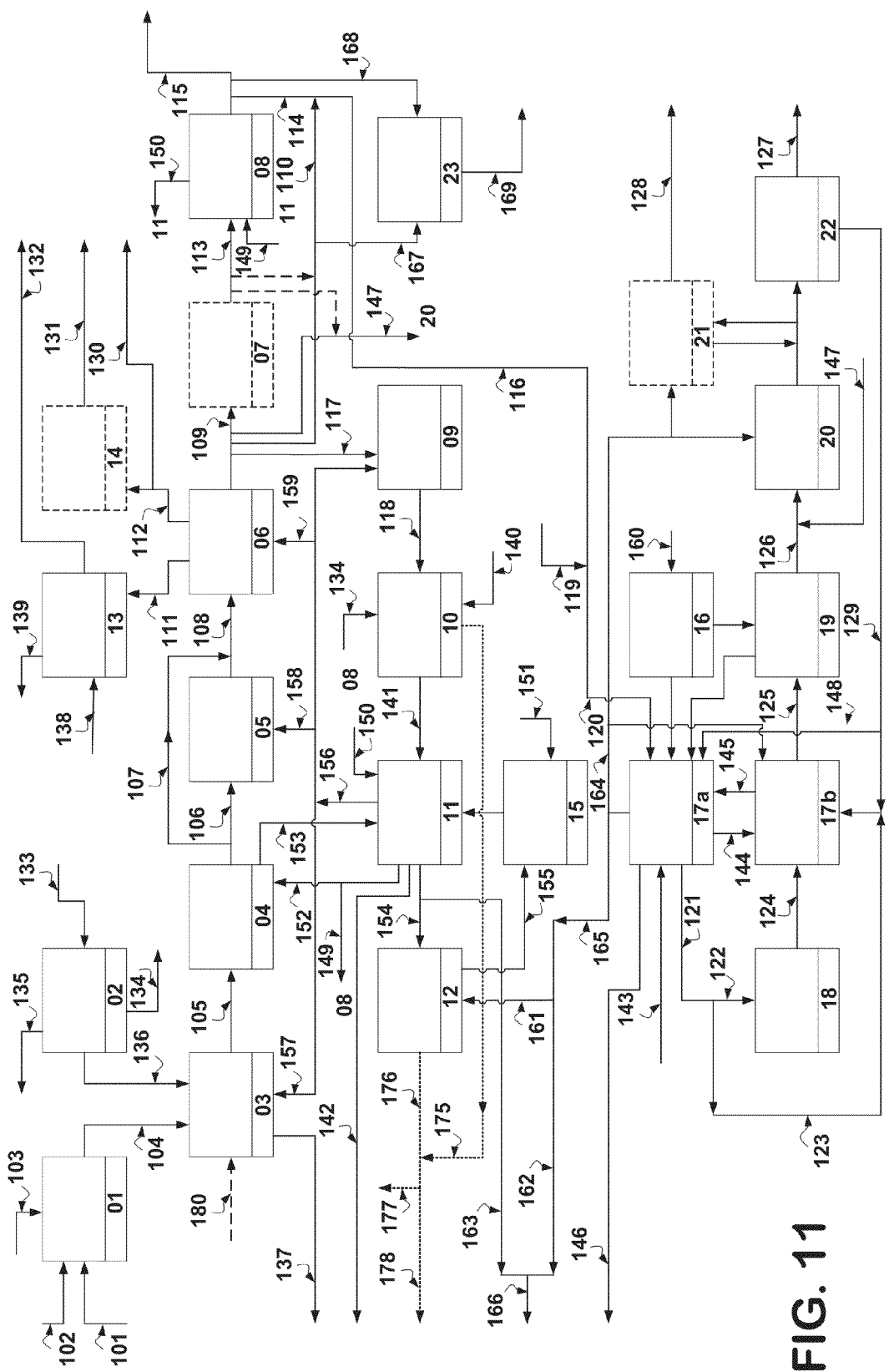
FIG. 11 is a diagram that represents an embodiment of the present invention (Scenario 5a) that is a variation of Scenario 5. In this scenario, the sulfur containing species and $CO_2$ are removed in a single process step after the shift conversion to maximize $CO_2$ removal.

FIG. 11 shows another embodiment of the present invention. This embodiment is identical to the alternate embodiment shown in FIG. 10, except in this case the sulfur species and $CO_2$ in the syngas are removed in a single process step after the shift conversion 05 to maximize $CO_2$ removal.

In each of the scenarios presented above, refinery off-gases 180 could effectively be utilized to convert them to higher value products. For example, the ConocoPhillips E-Gas gasifier, which is one of the preferred gasification technologies to be used with this invention, is generally designed to use recycled raw syngas to quench the gas leaving the second stage of the gasifier. This quenched syngas is then held at about 1800° F. for sufficient time in a non-catalytic reactor vessel for the gas to approach thermodynamic equilibrium. Refinery off-gases 180 could be used in place of the recycled syngas resulting in a 5% to 10% increase in syngas production. The syngas leaving the gasifier 105 would be essentially the same composition of the raw syngas without the addition of refinery off-gases. The issue associated with the sulfur content variation of the refinery off-gases would be easily managed by appropriately modifying the design of the acid gas removal system 04 required for processing the raw syngas downstream of the gasifier.

EXAMPLES

Having described the basic aspects of the invention, the following examples are given to illustrate specific embodiments thereof. The examples presented here specifically relates to making products of value to the refinery, where hydrogen is the critical high valued product. Because of the reliability requirements of a refinery, it is imperative that hydrogen be provided at high reliability.

Examples were calculated using commercially available computer process simulation packages (e.g., GT-Pro and Hysys) for different options. The examples are based on the flow sheets shown in FIGS. 2 and 4 that involve gasification of 6,000 tons per day (tpd) of petroleum coke of composition given in Table 2 to produce electricity, steam, SNG and hydrogen. To ensure hydrogen reliability at least part of the hydrogen is produced from SMR using SNG as the primary feedstock. Natural gas is used as a backup to ensure product reliability.

Example 1

Low Product Cost

FIG. 2 shows the block flow diagram for this scenario. Refinery hydrogen demand in this scenario is to be met by a combination of hydrogen from the SMR and hydrogen from the gasification unit.

The gasification facility will be the primary source of feed (SNG) to the SMR once the gasification facility reaches full plant availability. In addition, when SNG production exceeds that required for hydrogen production the excess SNG will be sold into the existing natural gas distribution network therefore assuring that the gasification facility can sell product even when the refinery demand may be reduced.

The feed and product interchange with the refinery are shown in Tables 3 and 4.

In this scenario up to 75% of the hydrogen and steam is considered to be supplied by the gasifier. With the correct plans in place the impact of the shutdown of one gasifier on steam supply will be less than a 35% reduction and has a strong possibility of being 30% or less.

Example 2

Maximum Reliability

FIG. 4 shows the block flow diagram for this scenario.

As in Scenario 1, the gasification facility will be the primary source of feed (SNG) to the SMR's once the gasification facility reaches full plant availability. In addition, when SNG production exceeds that required for hydrogen production the excess SNG could be sold into the existing natural gas distribution network therefore assuring that the gasification facility can sell product even when refinery demand is reduced.

In this scenario, all the hydrogen to the refinery and some or all of the steam demand of the refinery may come from the SMR. Under this scenario, hydrogen availability to the refinery will not be impacted by gasifier operation. In this scenario, if one of the gasifiers shuts down requiring the spare to be restarted less than 20% of the steam flow will be interrupted.

The feed and product interchange with the refinery are shown in Tables 3 and 5.

Product Availability:

In all the scenarios associated with the present invention, the gasification facility could be built with or without a spare gasifier. Based on the availability data for the gasifier, SMR and associated systems from prior-art in the area and from our own experience in running large-scale SMR units, the expected availabilities of hydrogen production from integrated gasification-SMR system are shown in Table 6.

TABLE 2

| Feedstock (petroleum coke) composition | |
|---|---|
| Analysis | Weight Percent |
| Proximate | |
| Moisture | 7.0 |
| Ash | 0.3 |
| Volatile matter | 10.0 |
| Fixed carbon | 82.7 |
| Total | 100 |
| Ultimate | |
| Moisture | 7.0 |
| Ash | 0.3 |
| Carbon | 81.7 |
| Hydrogen | 2.7 |
| Nitrogen | 1.8 |
| Sulfur | 6.5 |
| Total | 100 |
| HHV as received (Btu/lb) | 13,000 |
| LHV as received (Btu/lb) | 12,673 |

TABLE 3

| | | | | | | | | | | | | | |
|---|---|---|---|---|---|---|---|---|---|---|---|---|---|
| Major Feed and Product Streams | | | | | | | | | | | | | |
| | Pet. | | Power Produced | | SNG Produced | | $H_2$ | | Fuel | Steam | | $CO_2$ | |
| Scenario | Coke (tpd) | $O_2$ (tpd) | Total (MWe) | Export (MWe) | Total (MMscfd) | Export (MMscfd) | Gasif. (MMscfd) | SMR (Mmscfd) | Gas (MMscfd) | Gasif. (MMscfd) | SMR (Mmscfd) | Gasif. (MMscfd) | SMR (MMscfd) |
| 1 (FIG. 2) | 6,000 | 5,400 | 109 | 149 | 41 | 12 | 100 | 65 | 0 | 385 | 115 | 8,200 | 800 |
| 2 (FIG. 4) | 6,000 | 5,400 | 109 | 145 | 75.8 | 0 | 0 | 165 | 0 | 200 | 300 | 8,200 | 2,100 |

TABLE 4

Composition and flows of major streams for Scenario-1

| Parameters | Units | Components | | | | | | | | |
|---|---|---|---|---|---|---|---|---|---|---|
| | | Pet. Coke (101) | Flux (102) | Water (103) | Slurry (104) | $O_2$ (136) | Raw Syngas (105) | Syngas To 05 (106) | Syngas Bypass (107) | Syngas To 09 (117) |
| Temp. | F. | 77 | 77 | 77 | 300 | 282.6 | 1756.4 | 100.0 | 100.0 | 100.0 |
| Pressure | psia | 14.7 | 14.7 | 14.7 | 750 | 820 | 720.0 | 640.2 | 640.2 | 640.2 |
| Molar Flow | MMscfd | | | | | | 470.3 | 203.8 | 97.2 | 128.4 |
| Mass Flow | klb/hr | 499 | 10 | 214.9 | 724.4 | 448.5 | 1161.0 | 504.9 | 240.9 | 318.1 |
| HHV | Btu/scf | | | | | | 276.8 | 303.0 | 303.0 | 303.0 |
| LHV | Btu/scf | | | | | | 261.3 | 286.0 | 286.0 | 286.0 |
| $H_2$ | mol % | | | | | | 24.7 | 27.1 | 27.1 | 27.1 |
| CO | " | | | | | | 51.1 | 55.9 | 55.9 | 55.9 |
| $CO_2$ | " | | | | | | 11.4 | 12.6 | 12.6 | 12.6 |
| $N_2$ + Ar | " | | | | | 0.5 | 0.8 | 0.8 | 0.8 | 0.8 |
| $CH_4$ | " | | | | | | 3.2 | 3.4 | 3.4 | 3.4 |
| $H_2O$ | " | | | | 100.0 | | 7.0 | 0.2 | 0.2 | 0.2 |
| $H_2S$ | " | | | | | | 1.8 | 0.0 | 0.0 | 0.0 |
| COS | " | | | | | | 0.1 | 0.0 | 0.0 | 0.0 |
| $O_2$ | " | | | | | 99.5 | 0.0 | 0.0 | 0.0 | 0.0 |

| Parameters | Components | | | | | | | |
|---|---|---|---|---|---|---|---|---|
| | Syngas To 06 (108) | Crude $CO_2$ (112) | SNG To 17 (116) | SNG Export (115) | $H_2$ Gasif. (150) | $H_2$ SMR (127) | Steam Export (162) | Steam Export (163) |
| Temp. | 99.8 | 110.0 | 100.0 | 100.0 | 100.0 | 100.0 | 900.0 | 900.0 |
| Pressure | 595.2 | 18.0 | 565.0 | 565.0 | 365.0 | 365.0 | 1215.0 | 1215.0 |
| Molar Flow | 408.7 | 143.5 | 29.0 | 12.0 | 100.0 | 65.0 | | |
| Mass Flow | 959.0 | 692.3 | 52.8 | 21.8 | 22.0 | 14.3 | 115.0 | 385.0 |
| HHV | 223.9 | 2.9 | 966.8 | 966.8 | 325.0 | 325.0 | | |
| LHV | 198.3 | 2.5 | 871.3 | 871.3 | 275.0 | 275.0 | | |
| $H_2$ | 46.2 | 0.7 | 0.6 | 0.6 | 100.0 | 100.0 | | |
| CO | 14.9 | 0.2 | 0.0 | 0.0 | | | | |
| $CO_2$ | 35.5 | 98.9 | 0.9 | 0.9 | | | | |
| $N_2$ + Ar | 0.6 | 0.0 | 3.3 | 3.3 | | | | |
| $CH_4$ | 2.5 | 0.0 | 95.3 | 95.3 | | | | |
| $H_2O$ | 0.2 | 0.2 | 0.0 | 0.0 | | | 100.0 | 100.0 |
| $H_2S$ | 0.0 | 0.0 | 0.0 | 0.0 | | | | |
| COS | 0.0 | 0.0 | 0.0 | 0.0 | | | | |
| $O_2$ | 0.0 | 0.0 | 0.0 | 0.0 | | | | |

TABLE 5

Composition and flows of major streams for Scenario-2

| Parameters | Units | Components | | | | | | | |
|---|---|---|---|---|---|---|---|---|---|
| | | Pet. Coke (101) | Flux (102) | Water (103) | Slurry (104) | $O_2$ (136) | Raw Syngas (105) | Syngas To 05 (106) | Syngas Bypass (107) |
| Temp. | F. | 77 | 77 | 77 | 300 | 262.6 | 1756.4 | 100.0 | 100.0 |
| Pressure | psia | 14.7 | 14.7 | 14.7 | 750 | 820 | 720.0 | 640.2 | 640.2 |
| Molar Flow | MMscfd | | | | | | 470.3 | 203.8 | 97.2 |
| Mass Flow | klb/hr | 499 | 10 | 214.9 | 724.4 | 448.5 | 1161.0 | 504.9 | 240.9 |
| HHV | Btu/scf | | | | | | 276.8 | 303.0 | 303.0 |
| LHV | Btu/scf | | | | | | 261.3 | 286.0 | 286.0 |
| $H_2$ | mol % | | | | | | 24.7 | 27.1 | 27.1 |
| CO | " | | | | | | 51.1 | 55.9 | 55.9 |
| $CO_2$ | " | | | | | | 11.4 | 12.6 | 12.6 |
| $N_2$ + Ar | " | | | | | 0.5 | 0.8 | 0.8 | 0.8 |
| $CH_4$ | " | | | | | | 3.2 | 3.4 | 3.4 |
| $H_2O$ | " | | | | 100.0 | | 7.0 | 0.2 | 0.2 |
| $H_2S$ | " | | | | | | 1.8 | 0.0 | 0.0 |
| COS | " | | | | | | 0.1 | 0.0 | 0.0 |
| $O_2$ | " | | | | | 99.5 | 0.0 | 0.0 | 0.0 |

TABLE 5-continued

Composition and flows of major streams for Scenario-2

| Parameters | Components | | | | | | | |
|---|---|---|---|---|---|---|---|---|
| | Syngas To 09 (117) | Syngas To 06 (108) | Crude $CO_2$ (112) | SNG To 17 (116) | SNG Export (115) | $H_2$ SMR (127) | Steam Export (162) | Steam Export (163) |
| Temp. | 100.0 | 99.8 | 110.0 | 100.0 | 100.0 | 100.0 | 850.0 | 850.0 |
| Pressure | 640.2 | 595.2 | 18.0 | 565.0 | 565.0 | 365.0 | 1215.0 | 1215.0 |
| Molar Flow | 128.4 | 408.7 | 143.5 | 75.4 | 0.0 | 165.0 | | |
| Mass Flow | 318.1 | 959.0 | 692.3 | 137.5 | 0.0 | 37.4 | 300.0 | 200.0 |
| HHV | 303.0 | 223.9 | 2.9 | 966.8 | 966.8 | 325.0 | | |
| LHV | 286.0 | 198.3 | 2.5 | 871.3 | 871.3 | 275.0 | | |
| $H_2$ | 27.1 | 46.2 | 0.7 | 0.6 | 0.6 | 100.0 | | |
| CO | 55.9 | 14.9 | 0.2 | 0.0 | 0.0 | | | |
| $CO_2$ | 12.6 | 35.5 | 98.9 | 0.9 | 0.9 | | | |
| $N_2$ + Ar | 0.8 | 0.6 | 0.0 | 3.3 | 3.3 | | | |
| $CH_4$ | 3.4 | 2.5 | 0.0 | 95.3 | 95.3 | | | |
| $H_2O$ | 0.2 | 0.2 | 0.2 | 0.0 | 0.0 | | 100.0 | 100.0 |
| $H_2S$ | 0.0 | 0.0 | 0.0 | 0.0 | 0.0 | | | |
| COS | 0.0 | 0.0 | 0.0 | 0.0 | 0.0 | | | |
| $O_2$ | 0.0 | 0.0 | 0.0 | 0.0 | 0.0 | | | |

TABLE 6

Expected Hydrogen Availabilities from Integrated Gasification-SMR System

| System | Availability (%) | | | | | |
|---|---|---|---|---|---|---|
| | Conventional | Integrated scenario | | | | |
| | | 1 | 2 | 3 | 4 | 5 |
| Gasification without spare | 80-85 | | | | | |
| Gasification with spare | 90-94 | | | | | |
| SMR | >98 | | | | | |
| Gasification without spare + SMR (this invention) | | 90-92 | >98 | >98 | 90-92 | >98 |
| Gasification with spare + SMR (this invention) | | 94-96 | >98 | >98 | 94-96 | >98 |

Other embodiments of the present invention may include one or more of the following:
1. Mixing 0 to 90% of gasifier syngas with the SNG as SMR feed.
2. Using MDEA, Selexol® for acid gas removal.
3. Using two-stage Selexol for acid gas removal after shift conversion in the gasification section (see FIGS. 3, 5, 7, 9, and 11).
4. Using a BGL gasifier with catalytic partial oxidation (CPDX).
5. Feeding refinery off-gas to the gasifier.

Although the invention has been described in detail with reference to certain preferred embodiments, those skilled in the art will recognize that these are other embodiments within the spirit and the scope of the claims.

What is claimed is:

1. A process for providing hydrogen at a high level of reliability from a gasification system comprising:
   a) gasification of a carbonaceous material to form a synthesis gas;
   b) dividing the synthesis gas into a first portion and a second portion; fueling an at least one gas turbine with the first portion of the synthesis gas and/or expanding steam in a steam turbine to generate electricity;
   c) processing the second portion of synthesis gas to form a treated synthesis gas;
   d) dividing the treated synthesis gas into two or more portions;
   e) conversion of a first portion of the treated synthesis gas to synthetic natural gas; and
   f) feeding at least a first portion of the synthetic natural gas to a steam methane reforming process to produce hydrogen, wherein the synthetic natural gas is mixed with a second portion of the treated synthesis gas;
   wherein steps (a), (c), and (f) are exothermic reactions resulting in release of heat; and
   g) recovering at least a portion of the heat released by the exothermic reactions to produce steam.

2. The process of claim 1, wherein the process further comprises recovering hydrogen from a portion of the treated synthesis gas from step (e) by further processing in a shift reactor and a pressure swing adsorption unit.

3. The process of claim 1, wherein the process further comprises recovering carbon dioxide from a waste gas stream produced in step (d) and/or from the feed to a pressure swing adsorption unit within the steam methane reforming process.

4. The process of claim 2, wherein the process further comprises producing fuel gas by mixing a second portion of synthetic natural gas from step (f and a portion of treated synthesis gas from step (e).

5. The process of claim 1, wherein the process further comprises recovering hydrogen from a portion of the treated synthesis gas from step (e) by feeding it to a shift reactor within a steam methane reforming process.

6. The process of claim 5, wherein the process further comprises producing fuel gas by mixing a portion of synthetic natural gas from step (f) and a portion of treated synthesis gas from step (e).

7. The process of claim 6, wherein the process further comprises recovering carbon dioxide from a waste gas stream produced in step (d) and/or from the feed to a pressure swing adsorption unit within the steam methane reforming process.

8. The process of claim 2, wherein the process further comprises recovering carbon dioxide from a waste gas stream produced in step (d) and/or from the feed to a pressure swing adsorption unit within the steam methane reforming process.

9. The process of claim 4, wherein the process further comprises recovering carbon dioxide from a waste gas stream produced in step (d) and/or from the feed to a pressure swing adsorption unit within the steam methane reforming process.

10. The process of claim 5, wherein the process further comprises recovering carbon dioxide from a waste gas stream produced in step (d) and/or from the feed to a pressure swing adsorption unit within the steam methane reforming process.

\* \* \* \* \*